No. 614,143. Patented Nov. 15, 1898.
G. W. TALLMAN.
CAR INDICATOR.
(Application filed Apr. 20, 1898.)
(No Model.)
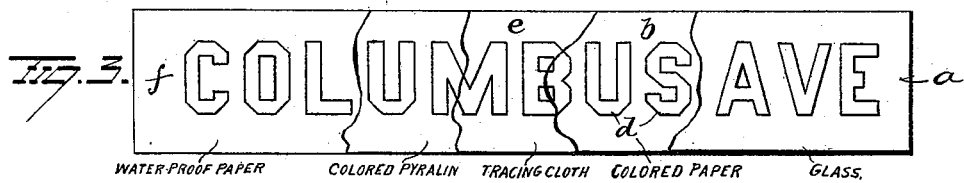
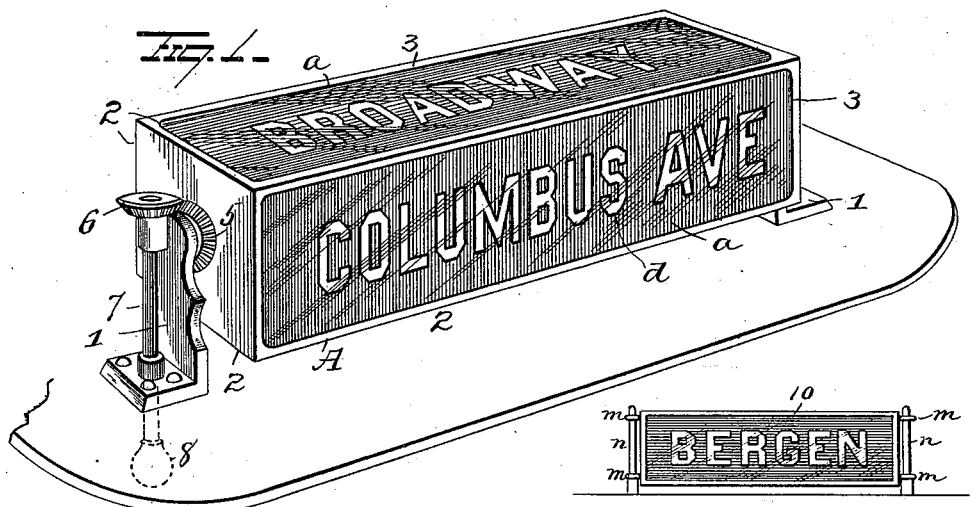
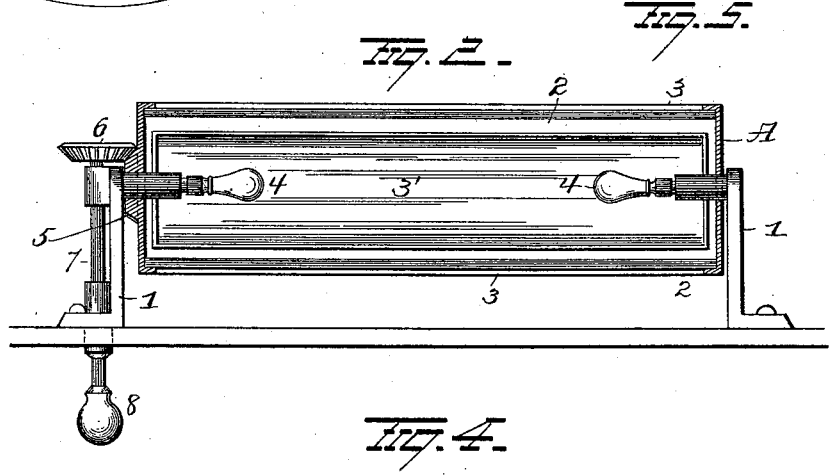
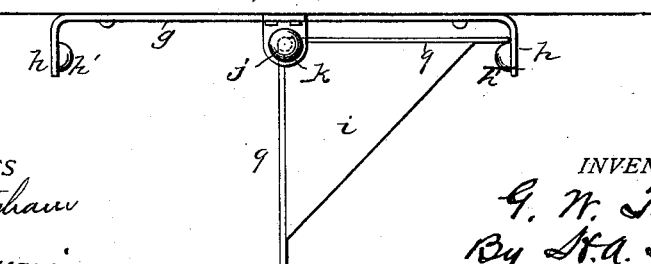
WITNESSES
INVENTOR
G. W. Tallman
By H. A. Seymour
Attorney

UNITED STATES PATENT OFFICE.

GEORGE W. TALLMAN, OF NEW YORK, N. Y., ASSIGNOR TO THE CHANGEABLE ILLUMINATING INDICATOR COMPANY, OF SAME PLACE.

CAR-INDICATOR.

SPECIFICATION forming part of Letters Patent No. 614,143, dated November 15, 1898.

Application filed April 20, 1898. Serial No. 678,300. (No model.)

*To all whom it may concern:*

Be it known that I, GEORGE W. TALLMAN, of New York, in the county of New York and State of New York, have invented certain new and useful Improvements in Car-Indicators; and I do hereby declare the following to be a full, clear, and exact description of the invention, such as will enable others skilled in the art to which it appertains to make and use the same.

My invention relates to an improvement in car-indicators.

As is well known, the cars on the street-railroads of large cities are painted different colors to designate their destination or they are provided with sign-boards the colors of which are known to indicate the destination of the car. It also frequently occurs that the cars of various lines run for a greater or less distance over the same tracks, and to indicate the road to which each car belongs and its destination different colors are employed, as above mentioned; and, again, it sometimes happens that the route of cars is through certain specific sections or streets of a city, and as these cars sometimes run on the tracks of different roads it is important to know just which way and to what section a car is bound.

It is the object of my invention to provide a car-indicator by means of which either in the day or equally as easily at night pedestrians can ascertain to what street or section of the city a car is bound, to so construct said indicator that the color which it displays shall assist in denoting the destination of the car, and to provide means whereby the color and names on the indicator can be changed when the car is passing over different portions of its route.

With these objects in view the invention consists in certain novel features of construction and combinations and arrangements of parts, as hereinafter set forth, and pointed out in the claims.

In the accompanying drawings, Figure 1 is a view of my improved indicator, showing the same partly in section. Figs. 2 and 3 are views illustrating details. Figs. 4 and 5 illustrate modifications.

A represents a revoluble box or casing mounted revolubly in standards 1, secured to the front of the car-roof or to any part of car desired. The box or casing is provided with any desired number of sides 2, the number of sides preferably corresponding with the number of sections of the route which it is desired to designate, and each side may be painted a different color or combination of colors, or all the sides may be painted the same color, if desired. The box or casing may be made of wood or metal, as desired, and each side is provided with an elongated slot or opening 3, extending approximately from end to end thereof. Each slot or opening will be covered in a manner which will now be explained in detail. Each slot or opening is covered by a plate or glass *a*, and against this a strip *b* is secured. The strip *b* is of a color which is known to the public as the designation of a certain route; but before the colored strip is secured in place letters *d* are cut out, the words indicating the name of the route which the color of the strip designates—for instance, "Columbus Ave.;" or space for the letters of the destination may be cut out. A strip of thin tracing-cloth *e* is placed immediately upon and back of the strip *b*, and behind this a strip of waterproof paper *f* is secured, said strip *f* having letters cut out corresponding with the letters in the strip *b*. Between the tracing-cloth and the waterproof strip a strip of colored pyralin, celluloid, glass, or other translucent material is placed, the color of which corresponds with the color of the strip *b*.

Within the revoluble box or casing A a reflector 3' is located and preferably made U-shaped in cross-section, as shown in Fig. 2. Between said reflector and the slot or opening in the side of the box or casing lamps 4 are located. I prefer to use incandescence electric lamps, which may be supplied with current from a battery contained in the casing or in the car or in case of electric roads from the line.

One end of the box or casing is provided with a bevel-pinion 5, with which a bevel-pinion 6 on a vertical shaft 7 meshes. The shaft 7 is mounted in and passes through the car-roof and is provided at its lower end with a suitable hand-wheel 8 by means of which to operate.

From the construction and arrangement of parts above described it will be seen that during the day the exposed side of the indicator will show a color in the slot or opening designating the route, or a portion thereof, which the car will take, and that the letters in the colored strip will show white, the colored translucent material being behind the tracing-cloth. In the night the color of the strip $b$ could not be distinguished and would, in fact, appear to be black, or nearly so. In the night, therefore, the lamps within the box or casing will be lit and the light will be reflected through the tracing-cloth and colored pyralin or other translucent colored material where the same extend over the open letters, and the latter will therefore appear of a color the same as that of the strip $b$.

When the car is passing over different portions of its route, the indicator can be changed accordingly by merely turning it by manipulating the hand-wheel 8 on the shaft 7.

It may in some cases be desired to employ a car-indicator adapted to show but two destinations. Such a construction is shown in Fig. 4, wherein $g$ represents a plate, preferably of spring metal, secured to the car-roof and provided at its ends with depending spring-fingers $h$. Two sign-boards 9, constructed in the same manner as the sides of the box or casing hereinbefore described, are disposed at right angles to each other and secured together by means of triangular braces $i$. The sign-boards thus united are pivotally supported at $j$ midway between fingers $h$, and one journal is provided with a knob $k$. The free ends of the spring-fingers $h$ are provided with hemispherical blocks $h'$, adapted to engage by the free edges of the sign-boards, and thus one or the other sign-board will at all times be displayed. Any form of artificial light may be disposed behind the depending sign-board.

When a single designation is desired, the sign-board 10 may be constructed in the same manner as the sides of the box or casing and provided at its ends with screw-eyes $m$ to receive posts $n$ on the car-roof, as shown in Fig. 5. Any form of artificial light may be disposed behind the single sign-board.

Instead of constructing the device with transparent letters, the sign-board (or side of box) can be made transparent and colored and the letters indicating the designation opaque. Thus in the day the sign-board may appear blue with white letters and at night the board appears blue (the light shining through it) and the letters dark or black.

Instead of electric lamps any other form of artificial light may be used.

My improvements are also applicable for use for advertising purposes and may be placed in store-windows or other places where they will be seen by passers-by. For instance, the device may be used by theaters to advertise attractions. The color of the sign may designate a certain theater and the letters state the name of an actor or a play. At night the letters would appear of a color the same as the appearance of the body of the sign by daylight, and thus denote that a certain play or actor is at a certain theater, which latter will be made known by the color of the letters.

My improvements are very simple in construction, are very useful and convenient, and are effectual in all respects in the performance of their functions.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. A sign-board having a face of one color, letters formed therein having a color by reflected light different from the color on the face of the sign and presenting by transmitted light a color similar to that of the face of the sign.

2. In a car-indicator, the combination of a sign-board having a color indicative of a route or portion thereof and having openings for letters, a strip of translucent material behind said board and extending over said openings whereby to present letters having a reflecting color, a translucent strip having a color the same as the face of the sign, and a lamp behind said colored translucent strip, whereby the letters designating the route will appear white in daylight and the board colored and whereby said letters will appear of a color, at night, the same as that of the appearance of the board in daylight and board itself appear dark at night.

3. The combination with a board having a slot or opening therein, of a strip of glass over said opening, a colored strip having open letters on said glass, a waterproofing strip having letters corresponding with those in said colored strip, colored translucent material behind the strips having the letters, said letters and translucent material having a reflecting color in front of the strips having the letters, and a lamp behind the whole, whereby the letters will appear white by day with differently-colored background and at night appear in the color of the day-background upon a dark background substantially as set forth.

4. In a car-indicator, the combination with a revoluble box or casing having openings in its sides, and gearing for turning said box or opening, of a strip of a distinctive color over the slot or opening of each side of the box or casing, said strip having open letters, a white translucent strip extending over the open letters, translucent material behind each of said strips and of a color the same as first-mentioned strips, a reflector within the box or casing, and lamps within the box or casing and adapted to be disposed between said reflector and the exposed side of the box or casing, whereby the letters will appear white by day with differently-colored background and at night appear in the color of the day-background upon a dark background substantially as set forth.

5. In a sign-board, a strip comprising two portions consisting of a background and letter, one of said portions being opaque and presenting a distinctive color, the other of said portions being translucent, a translucent strip having a reflecting-surface and a second translucent strip behind the last-mentioned strip and having a color to correspond with the color of the opaque portion of the sign.

In testimony whereof I have signed this specification in the presence of two subscribing witnesses.

GEORGE W. TALLMAN.

Witnesses:
H. ELLERY MEYER,
CLIFFORD WOOD.